United States Patent [19]
Katz

[11] Patent Number: 5,495,284
[45] Date of Patent: Feb. 27, 1996

[54] SCHEDULING AND PROCESSING SYSTEM FOR TELEPHONE VIDEO COMMUNICATION

[76] Inventor: Ronald A. Katz, 570 S. Mapleton Dr., Los Angeles, Calif. 90024

[21] Appl. No.: 154,313

[22] Filed: Nov. 17, 1993

Related U.S. Application Data

[63] Continuation-in-part of Ser. No. 67,783, May 25, 1993, abandoned, which is a continuation-in-part of Ser. No. 31,235, Mar. 12, 1993, Pat. No. 5,412,708.

[51] Int. Cl.$^6$ .............................. H04N 7/14; H04M 11/00
[52] U.S. Cl. .................. 348/15; 379/92; 379/96
[58] Field of Search .................. 348/15, 14, 16, 348/17, 18, 19; 379/202, 203, 204, 205, 92, 94, 96, 93; H04N 7/15, 7/14

[56] References Cited

U.S. PATENT DOCUMENTS

| | | |
|---|---|---|
| 3,881,060 | 4/1975 | Connell et al. . |
| 4,493,948 | 1/1985 | Sues et al. . |
| 4,641,127 | 2/1987 | Hogan et al. . |
| 4,825,457 | 4/1989 | Lebowitz . |
| 4,843,377 | 6/1989 | Fuller et al. . |
| 4,876,597 | 10/1989 | Roy et al. . |
| 4,893,325 | 1/1990 | Pankonen et al. . |
| 4,916,435 | 4/1990 | Fuller . |
| 4,939,773 | 7/1990 | Katz . |
| 4,954,886 | 9/1990 | Elberbaum . |
| 4,962,473 | 10/1990 | Crain . |
| 4,992,866 | 2/1991 | Morgan . |
| 5,061,916 | 10/1991 | French et al. . |
| 5,065,393 | 11/1991 | Sibbitt et al. ................ 348/15 |
| 5,077,788 | 12/1991 | Cook et al. . |
| 5,109,399 | 4/1992 | Thompson . |
| 5,136,581 | 8/1992 | Muehrcke ................ 348/15 |
| 5,164,979 | 11/1992 | Choi . |
| 5,202,759 | 4/1993 | Laycock . |
| 5,204,670 | 4/1993 | Stinton . |
| 5,224,157 | 6/1993 | Yamada et al. . |
| 5,241,587 | 8/1993 | Horton et al. . |
| 5,264,929 | 11/1993 | Yamaguchi . |
| 5,323,445 | 6/1994 | Nakatsuka ................ 379/202 |

FOREIGN PATENT DOCUMENTS

| | | |
|---|---|---|
| 188286 | 7/1986 | European Pat. Off. . |
| 63-260536 | 4/1990 | Japan . |
| 0029456 | 2/1991 | Japan . |

OTHER PUBLICATIONS

Rangan, P. Venkat, "Video conferencing, file storage, and management in multimedia computer systems", *Computer Networks and ISDN Systems*, Mar. 1993, vol. 25, No. 8, pp. 901–919 (Article).

Imai, R., et al., "Multimedia Communication Technology", *Fujitsu Scientific & Technical Journal*, 1992, vol. 28, No. 2, pp. 172–179—(Article).

Yager, T., "Better Than Being There", *Byte*, Mar. 1993, vol. 18, pp. 129–130, 132–134—(Article).

Wright, Peter, "Vision by Telephone", *Computer Systems*, Jan. 1986 Bramley, (Great Britain)—(Article).

*Primary Examiner*—Curtis Kuntz
*Assistant Examiner*—Stella L. Woo
*Attorney, Agent, or Firm*—Nilsson, Wurst & Green

[57] ABSTRACT

A scheduling and processing system is disclosed for telephone and video communication with a plurality of remote locations from a central station. The system utilizes a dial-up telephone facility and telephonic television terminal units at the remote locations and memory structure for storing call schedule data on the telephonic television terminal units. In accordance with one embodiment, the system also includes telephone interface structure for interfacing the dial-up telephone facility to accomplish communication and at least one central video terminal including a speakerphone unit and a display device for providing television displays. Computer control structure receives calls through the dial-up telephone facility and the telephone interface structure stores the call schedule data in the memory structure for retrieval in a sequential order and for driving the telephone interface structure to provide connections from the central video terminal to the telephonic television terminal units in accordance with the sequential order for video communication.

24 Claims, 9 Drawing Sheets

VENDOR CELL

| TELEPHONE NO. & ADDRESS | PIN VENDOR NO. | TELEPHONE NO. | VIDEO FORMAT | RATING | PRIORITY |
|---|---|---|---|---|---|

| PERSONS | NAME | COMPANY NAME | OTHERS IN CONFERENCE | LAST PURCHASE DATA |
|---|---|---|---|---|

| CROSS REFERENCE NO. TO OTHER BUYER LOCATIONS | BUYERS AVAILABLE | TIME LIMIT |
|---|---|---|

| CALL BILLING DATA D1 | CALL BILLING DATA D2 | USE RATE |
| DATE - TIME - FORMAT NO. - | | |

70

BUYER CELL

| FIFO TIME ADDRESS | BUYER NO. | APPOINTMENT SCHEDULE |
|---|---|---|

- ( DAY - MONTH - YEAR - TIME - PERIOD# ) - ( DMYTP )

- ( DMYTP ) -      AVAILABILITY SCHEDULE

SCHEDULING AND PROCESSING SYSTEM FOR TELEPHONE VIDEO COMMUNICATION

CROSS REFERENCE TO RELATED APPLICATIONS

This application is a continuation-in-part application of application Ser. No. 08/067,783, entitled "VIDEOPHONE SYSTEM FOR SCRUTINY MONITORING WITH COMPUTER CONTROL" and filed on May 25, 1993, now abandoned, which is a continuation-in-part application of application Ser. No. 08/031,235, entitled "VIDEOPHONE SYSTEM FOR SCRUTINY MONITORING WITH COMPUTER CONTROL" and filed on Mar. 12, 1993, now U.S. Pat. No. 5,412,798.

FIELD OF THE INVENTION

The present invention relates generally to the field of computerized telephone and video communication, and more particularly, to a scheduling and processing system for telephone and video communication between remote locations and a central station. Such a system may be used in a variety of applications, such as for conferences related to merchandising, including purchasing, selling, marketing or the like, educational conventions for medical doctors and other professionals, game shows and so on.

BACKGROUND OF THE INVENTION

Over the years, integration of computer and telephone technologies has brought many advances in the telecommunication industry. Functionally integrating human operators with telephone network capabilities, voice and data switching capabilities, computer applications and databases, and voice processing technology not only provides human operators with immediate access to information from a wide variety of sources, but allows them to intelligently process each call as well. Telephone switches are linked with computers to coordinate computer information and intelligence with call handling capabilities to automatically add relevant data, as well as facsimile, graphics, video or audio communication capabilities. Select services or equipment such as automatic number identification (ANI) or dialed number identification service (DNIS) enhance calls and human capabilities by forwarding identifying information with a telephone call, thereby, eliminating steps otherwise performed by an operator to capture information regarding the caller. For applications involving large scale processing of calls, switch and host databases automatically link a call with a caller's record, eliminating the need for the caller to enter an identification number when using a voice response system.

More revolutionary applications use ANI to simultaneously pass both the call and the caller's current record to an operator's telephone and terminal. This obviates the need for the operator to obtain, enter and receive the caller's record from the database. Such advances have immensely enhanced human capabilities.

Somewhat concurrently, rapid developments in computer, telephone and video technologies have introduced the concept of visual communications or video conferencing. In particular, efforts at integrating these technologies have gained enormous momentum in recent years, resulting, in part, from a general desire in all industries to conserve time and expenses, and thereby, maximize human efficiency and productivity. The advent of videophones has enabled users to visually communicate from remote locations. Many industries are rapidly embracing the idea of video conferencing to eliminate escalating travel expenses. Employees or customers in different places can take part in interactive training sessions or seminars with no loss of time for travel. However, obstacles remain, particularly in traditional areas of cumbersome communication. Still, with developments, virtually every industry segment can profit from interactive data sharing in real time with the added advantage of face-to-face communication. Innovative technical advances are fast satisfying promises of enhanced capabilities, thereby allowing users to share and manipulate images from remote locations, such as pictures, graphs, maps or the like.

Technical breakthroughs in audio and video compression technology make desktop video conferencing both economical and practical for everyday business communications. To fully participate in video conferencing, the user's equipment must communicate with similar units, albeit from different equipment vendors. The International Telephone and Telegraph Consultative Committee (CCITT) has defined a standard called H.261 (or "Px64") detailing how video and audio signals are compressed and decompressed for transmission across a common link. At present, video conferencing systems do not necessarily comply to an industry standard and format. As a consequence, many types of video codecs are currently in use. At any rate, ongoing efforts at achieving compatibility and providing compression schemes that can transmit color images over POTS (plain old telephone system) all over the world are in the offing.

To consider an example of cumbersome communication, in the merchandising industry, vendors or sellers of goods typically spend many hours attempting to schedule appointments with various buyers for different organizations, travelling to and from the buyers' facilities and waiting for meetings, which may sometimes last only a short duration. Unfortunately, considerably more time and expense also is incurred in travelling to and from different facilities than is desirable. Moreover, as a practical matter, specific vendors typically are assigned to specific goods and interact with specific buyers, resulting in a need for more vendors dedicated to particular buyers.

As another example, drug and medical device manufacturers typically hire "detail" persons to travel and visit medical professionals such as doctors, pharmacologists, hospital representatives or the like, located at widely distributed areas around the country and the world to introduce details on new drugs and demonstrate new medical devices. These "detail" persons generally spend a majority of their time waiting to see medical doctors, often to receive only a few minutes of a doctors precious time. Many times, the waiting proves to be futile, especially in circumstances where doctors are summoned for emergencies or are otherwise busy. Also, as a consequence of uncertain schedules and time pressures, medical doctors often feel pressured by a "detail" person waiting at their offices.

Accordingly, the present invention recognizes the need for systems to communicate with remote locations over a widely distributed area from other places, as a central location, for the applications discussed above as well as many other diverse applications with similar requirements.

SUMMARY OF THE INVENTION

Generally, the system of the present invention involves communicating with a plurality of remote, widely distributed locations, from a central unit utilizing dial-up telephone facilities in today's computer environment, and with voice quality lines under computer control. Specifically, the dynamic graphics of telephonic video (on standard analog lines and digital lines over Integrated Services Digital Network (ISDN)) facilitate videophone, while video still displays and digital lines facilitate high fidelity (hi-fi) video displays along with audio capabilities, all combined with the interactive capability of computers to attain an effective scheduling and processing system for scheduling and implementing conferences between remote locations and a central location.

The system of the present invention contemplates applications ranging from conferences relating to merchandising (including purchasing, selling, marketing or the like) to educational conventions for medical doctors and other professionals, and to game shows and so on.

In one disclosed embodiment of the present invention, videophone cameras and speakerphones (or regular telephone instruments), for one-way or two-way communication are placed at each of a plurality of remote locations to communicate with a central system that may include several communication and control stations also equipped with some or all of the same capabilities. A video scene display (depicting motion and color) may be provided with graphics, audio and data signals at each communication and control station. The control station may utilize well known image enhancement techniques to facilitate high resolution images for closer observation.

In accordance with one specific embodiment related to merchandising, different vendors selling different products may be located at the remote locations and at least one central system including several communication and control stations may be located at each of a plurality of buyers' facilities. Each communication and central station or buyer terminal (monitor station) may be operated by an individual buyer. Alternatively, a single buyer viewing of multiple monitors is also contemplated. A sequence of scheduled appointments may be developed, as programmed along with intervals of video communication. A record of the scheduled appointments is maintained by the central system.

In accordance with one scenario, vendors may call the central system and, upon qualification, may schedule appointments with specific buyers. To execute appointments, on command, from the buyer location, communication may be initiated conforming to the display equipment at the vendor site. That is, as disclosed, the central system, or systems, incorporate multiple video format capability along with a bridge or switch unit to drive a display unit or monitor in a selected format in accordance with the capabilities of the current vendor. As disclosed, a single monitor may accommodate several formats or plural monitors can operate selectively for concurrent multiple displays.

At the appropriate times, identification designations for remote locations are provided in sequence, to address a memory for fetching telephone numbers and/or graphic display data also recorded when the appointments are scheduled. Accordingly, in sequence, vendor locations are dialed up via the public telephone system, either manually or automatically, to obtain audio-video communication providing an image of the vendor and the surrounding area at a specific vendor location.

Additionally, data associated with the vendor (or the buyer) may be graphically displayed for convenient reference. For each scene display with respect to a specific vendor, the graphic display of pertinent data provided may, for example, indicate the telephone number, the PIN number, the video format, vendor rating, current vendor delivery status and so Special controls such as a mouse may be instituted enabling manifestations at the vendor location to initiate action or alter the display. Special operations also may be commanded through the videophone, video still (high quality) or high fidelity (hi-fi) video means either on manual initiative or automatically by automatic apparatus.

A video recorder and/or video printer may be located at a remote vendor location or central unit for selectively or continuously obtaining a video recording or computer printout of displays.

Multiple central units or control stations may be employed to communicate with widely distributed vendor or buyer locations with capabilities to route calls to each other in the event that all of the communication lines are occupied and there is a considerable backlog of scheduled appointments. Calls may be routed to the next available operator (buyer), for example, in the event appointments scheduled for a particular buyer last longer than contemplated, or another buyer familiar with that line of products may step in and handle the appointment.

Under some circumstances it may be desirable to prioritize calls. For example, as the appointments are queued in sequence, specific appointments may precede other routed appointments in accordance with an override feature.

In accordance with an alternative embodiment, an independently managed telephonic interface appointment scheduling system may be located remote from buyers' and vendors' facilities. Vendors may call to schedule or change appointments and update information with respect to appointments with specific buyers. In an alternative embodiment, an appointment schedule for each specific buyer may be conveyed by facsimile, modem or the like, or alternatively, buyers may access the system and obtain the appointment schedules.

A record of the number of calls and related charges incurred by the buyers for appointments is maintained, which may be analyzed and ultimately rebilled to the vendors. Of course, charges for scheduling are incurred directly by the vendors.

These as well as other features of the present system will become apparent from the detailed description which follows, considered together with the appended drawings.

BRIEF DESCRIPTION OF THE DRAWINGS

A complete understanding of the invention and its advantages may be gained from consideration of the following description of some disclosed embodiments taken in conjunction with the accompanying drawings, in which:

FIG. 4 is a fragmentary diagrammatic representation of exemplary storage cells for information specific to a vendor and a buyer, as may be formatted in the system of the present invention;

DESCRIPTION OF THE PREFERRED EMBODIMENTS

As indicated above, a significant aspect of the system of the present invention is based on recognizing that a dial-up public telephone system may be effectively utilized for visual communication and conferences between a plurality of remote locations and a central station variously coupled to a plurality of communication and control stations. More specifically, it has been recognized that for an effective scheduling and processing system, dial-up voice quality lines, such as standard analog or digital lines, may be employed variously in conjunction with videophone equipment, computer facilities and various forms of telephonic equipment as voice generators, auto dialers and D-channel or in-band signalling apparatus.

Figure 1:
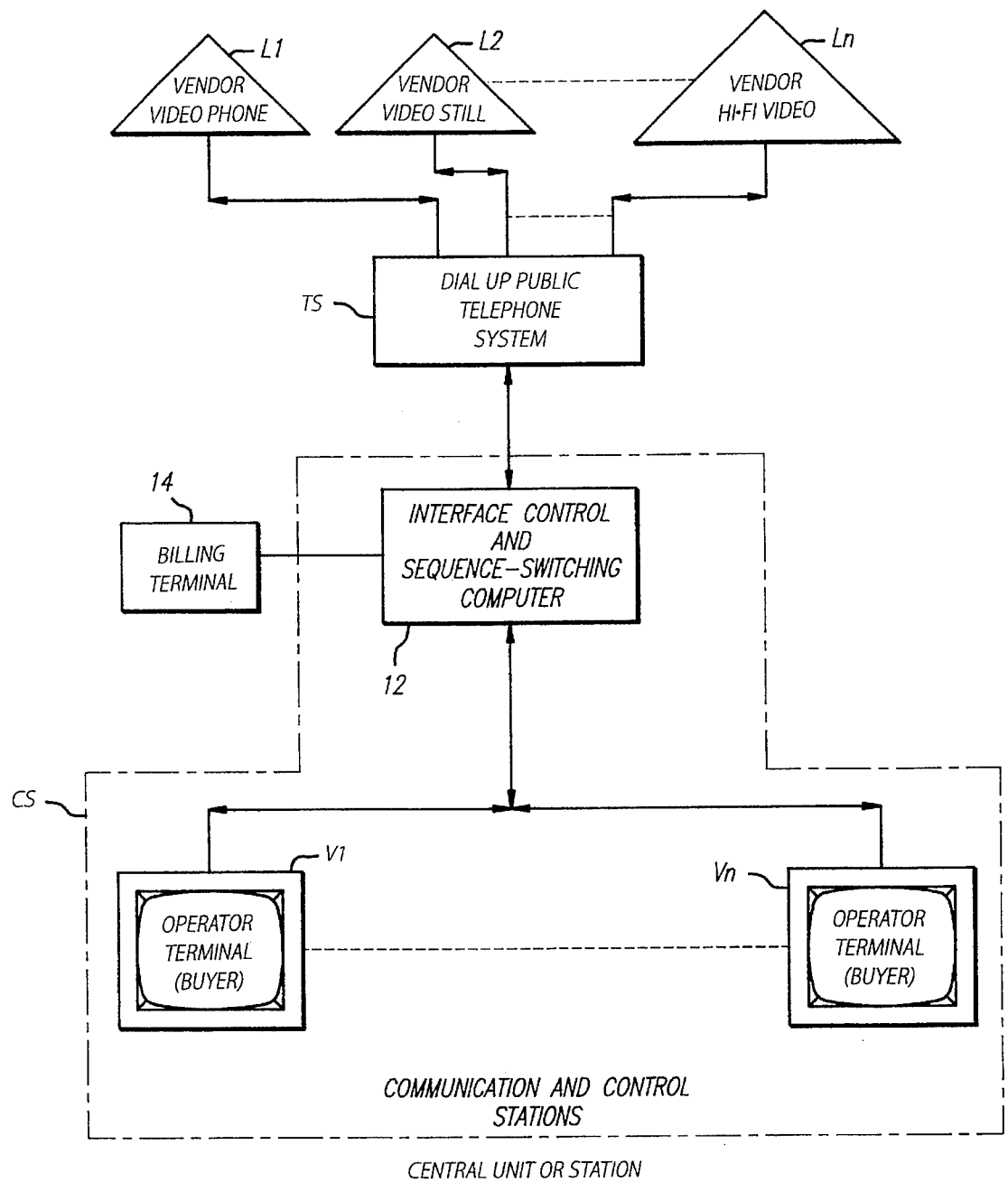
FIG. 1 is a high-level block diagram of one embodiment of the scheduling and processing system in accordance with the present invention, illustrating a plurality of remote vendor locations in communication with a central unit (located for example at a buyer's facility) including a plurality of communication and control stations.

To that end, a dial-up public telephone system TS is illustrated in FIG. 1 (upper center) affording effective communication between a plurality of remote locations L1–Ln, and at least one central unit or station CS (indicated in broken lines). For merchandising applications, the remote locations L1–Ln represent specific vendor locations in communication with a central station CS, which may be located either at a specific buyer facility or at different locations, some being remote from a buyer facility. In the disclosed embodiment of FIG. 1, the central unit CS includes a plurality of communication and control stations, each of which may comprise one or more operator (buyer) terminals V1–Vn to accommodate individual buyers.

As an example, XYZ Drug Company may employ individual merchandise buyers responsible for purchasing specific types of items. One buyer may be designated for purchasing vitamins and over the counter medications, another for purchasing magazines and toys, and so on. In accordance with one embodiment, the central station CS may be installed at a buyer's facility and networked to a plurality of buyer terminals V1–Vn installed at each individual buyer's desk. It should be recognized that in situations where a company has only one or two buyers, the operator (buyer) terminals V1–Vn may serve as the central station CS.

Appointments for conferences may be scheduled by vendors or buyers, although in keeping with present merchandising practice, it is generally contemplated that vendors would pursue scheduled appointments. However, appointment execution calls are generally initiated by buyers, either directly or automatically using autodialers.

A fully automated interactive voice response system including ARUs (audio response units) may schedule appointments for specific buyers and subsequently load the schedules for all the buyers into the central station CS. Alternatively, each specific buyer's schedule may be loaded into memory in each buyer terminal V1–Vn. In some instances, vendors may communicate with the central station CS to verify appointments and initiate the conferences if necessary. During the visual conferences, vendors may display their goods, packaging or promotional displays and otherwise effectively communicate with the buyers.

The remote vendor locations L1–Ln (FIG. 1) may be widely distributed and may involve diverse products, for example, vendors for markets such as grocery chains and convenience stores, department stores, restaurants, factories, plants, businesses, medical offices, hospitals, drug stores and so on. Essentially, each vendor location L1–Ln is equipped with at least one of a videophone, video still (high quality) or hi-fi (high fidelity) video capability (described below) to provide telephonic signals through the telephone system TS and accomplish a display at the central unit CS, specifically for any of the communication and control stations (for example buyer terminals V1–Vn). As described above, the central system CS may be located at a buyer's facility for communication with a plurality of different communication and control stations (buyer terminals). In accordance with an alternative embodiment, the control structure of central system CS may be independently managed and located remote from all buyers' and vendors' facilities (FIG. 8), described in further detail below.

Along with a video signal display (real time, color, motion, freeze frame), under manual or computer control, audio and data signals are employed to supplement and enhance conferencing operations. In an exemplary system, each of the vendor locations L1–Ln may incorporate several video speakerphones (with one-way and two-way communication and echo canceling), a camera (separate cameras may be used to concurrently provide images for a videophone and high quality still images), switches, automatic dialing devices and computer memory capability for initiating and responding to commands from the central system CS, as well as for initiating various actions to accomplish change or to accommodate special circumstances.

The central system CS incorporates a telephonic interface, control and sequence-switching computer 12 coupled to the operator terminals or videophone monitor stations V1–Vn. Accordingly, in one format, during routine operation, the videophone stations V1–Vn at identified remote vendor locations L1–Ln simply provide audio, Scene and graphic displays of particular vendors and their surrounding area where goods may be displayed. Each of the buyer terminals V1–Vn may be dedicated to communicating with a specific one or more of the vendor locations L1–Ln, depending upon established relationships or customary dealings.

The buyer terminals V1–Vn may be supplemented with audio telephone capability to provide for alternative communication. As indicated below, such capability also may be important at the vendor locations L1–Ln.

As another consideration, billing procedures may be initiated by communication from the computer 12 to a billing terminal 14. Alternatively or additionally, under certain conditions, a call is automatically placed to the billing terminal 14 providing billing data (stored in billing data unit 49, FIG. 3). Specifically for example, under predefined conditions, the control computer 12 actuates an autodialer to dial-up the billing terminal on a specific line.

Conventionally, in merchandising applications, it is appropriate for the vendors to incur communication expenses. To facilitate this, a reduced rate service for long distance outbound calling, for example MEGACOM, may be installed at each of the buyers' facilities. Data on calls made by the buyers may be obtained from the telephone company (e.g., AT&T telephone company) and analyzed to isolate calls made to each specific vendor and compute the cumulative charges incurred. For example, outgoing call activity may be monitored at each of the buyers' facilities or the independently managed central site located elsewhere (FIG. 8) and rebilled to specific vendors.

Alternatively, toll free or "800" services at each of the vendor locations may be installed, and "800" numbers initiated by the buyers may be billed to each of the vendor locations. Such toll free or "800" calls are only contemplated for analog video lines. Further, a central service may contract for and install telephone services at both the buyer and vendor locations in order to obtain and report on calls to and from the buyers as well as centrally bill both buyers and vendors for all video telephone communication.

As a further example, the central station at each buyer facility may maintain a record of outbound calls made by all the buyers located at that facility including data such as the date and time of the call, the name of the buyer initiating the call and the duration of the call. Accordingly, information for each buyer may be subsequently compiled.

Furthermore, a summary of each buyer's efficiency may be recorded and provided to interested parties. For example, a buyer's efficiency may be ascertained by the number of video calls made by a specific buyer every week, the average length of the video call, and other data displayed from the database, namely, name of the vendor, names of the persons participating in the call, and so on. For example, for a particular buyer a summary could indicate that during the week of Mar. 20, 1993, 40 calls were made for an average length of 20 minutes. Detailed information may further indicate that specifically at 10:00 a.m. on Mar. 20, 1993, a first appointment with Mr. John Blow, of ABC Fruit Company was initiated, which lasted for 1 hour and 12 minutes, and at 11:12 a.m., a second appointment with Ms. Mary Smith of XYZ Cutlery Company lasted 11 minutes and so on.

The central station CS may automatically place a call (for example, to keep an appointment) to the appropriate vendor location, determined by a database associated with the particular one of the vendor locations L1–Ln, with which the specific buyer has an appointment scheduled. Alternatively, the buyer may actuate an autodialer, such that the autodialer code number (obtained from the central station database) displayed on the buyer's video terminal connects him or her to the appropriate vendor. In the event there are complications or otherwise, the buyer may use a regular telephone or a cellular telephone and manually dial the telephone number displayed on the video terminal. It is currently contemplated that cellular transmission will ultimately provide dynamic motion and high resolutions freeze frame displays.

Preliminarily, considering an exemplary sequence of operations with reference to FIG. 1, assume that different vendors are located at vendor locations L1–Ln, equipped with videophone, video still (high quality) or hi-fi video capabilities and different buyers are located at buyer terminals V1–Vn. Each buyer terminal may be equipped with a platform featuring at least one or more of these communication capabilities to accommodate select communications with various vendors. Further assume that a vendor at vendor location L1 wishes to schedule an appointment with a buyer at buyer terminal V1. As a result, telephone equipment at the location L1 is actuated, either manually or automatically, prompting dial-up operations to accomplish a connection from the vendor location L1 through the telephone system TS and the computer 12 to the buyer terminal V1. As described in detail below, in such a situation, the called number to the computer 12 (originated by the vendor location L1) indicates the particular buyer called. That is, the specific buyer with which the vendor may be entitled to schedule an appointment is indicated by dialed number identification signals (DNIS) using a capability readily available from the telephone system TS, as for example on the so-called D-channel. The dialed number identification signals (DNIS) may indicate the buyer terminal for example, where certain buyer terminals at the central station CS are dedicated for communication with specific vendors. In addition, with DNIS, customized responses by live operators or audio response units (ARU) may be provided.

It is to be noted that while the D-channel apparatus provides one operational configuration, some DNIS and/or ANI (Automatic Number Identification) data signals can be received in-band without D-channel apparatus. In any event, DNIS signals indicate the called number from the vendor location L1 identifying that a vendor is qualified to schedule an appointment with the specific buyer. A vendor may be further qualified by the vendor's PIN number (personal identification number).

It should be noted that during videophone communications between a vendor location L1 and the buyer terminal V1, with the data provided (e.g., using DNIS and ANI for identification), the computer 12 may fetch identification data for graphic displays. For example, the buyer terminal V1 may view a video scene within the vendor location L1 along with graphic data, for example, from storage cell 70 (FIG. 4) such as the name, rating and so on. Of course, image enhancing techniques, as associated with current videophone technology for enlarging the capabilities of signals received at the central station CS or to provide higher resolution pictures may be utilized. Accordingly, large monitors may be utilized at the buyer terminals V1–Vn for viewing such enhanced images.

Alternately, vendors sitting at the vendor locations L1–Ln may call a predetermined telephone number for the central station CS, whereby as disclosed below, the use of ARU interactive technology including voice generators can prompt entry by touch tone of remote location code number (with DNIS). For example, vendors at the remote locations may be cued by voice prompts, either live or prerecorded, for example, "Please enter your remote location code."

As another feature, an incoming line can be designated at the central station CS, such as an "800" line to receive calls from any telephone to prompt scheduling. For example, a call on the "800" line may be answered by an interface or an operator to schedule an appointment with a specific buyer. In that regard, the vendor might be specified by ANI signals. Accordingly, a vendor can simply call the designated number from any telephone to enter the scheduling program.

Prior to executing an appointment, changes may be implemented. Furthermore, a camera providing dynamic or still images (high quality) at the location L1 may be selected, scenes may be modified and audio or video may be controlled. Note that the cameras may be of various kinds, for example, wireless, panning, zoom and so on. Also, the cameras may be operated to modify scenes by panning, zooming, tilting or providing freeze frames (high resolution), as desired. Furthermore, a record (VCR or video printer) may be made of all received signals as for subsequent study. Note also that by assigning each of the buyer terminals V1–Vn distinct DNIS (called number), identification data in the memory can be accessed accurately by the DNIS number if desired.

For scheduling purposes, PIN numbers (personal identification numbers) are assigned to vendors. The PIN number may be coded to indicate the specific organization that a vendor is associated with. Entry of a PIN number by a vendor may initiate contact with the control station CS. In some configurations, initiating contact with the central station CS may be controlled by a clock 40 (FIG. 2), such that the central station CS may be configured only to receive calls from vendors at select intervals of time, for example between 7 a.m. and 12 p.m. Additionally, specifications may be designated for specific groups of vendors. Thus, the system may be configured such that DNIS and ANI communication features cross reference with the clock prior to answering. For example, if the present time is between 5 p.m. and 7 p.m., only select vendor calls are accepted. Some vendors may be accorded priority status allowing them to schedule appointments on select priority days, for example, Thursdays. Similarly, priority status may be accorded to vendors offering distressed merchandise at discount rates. A priority field in the vendor's cell (FIG. 4) may incorporate a use-rate component, whereby extent of use by vendors may be controlled.

Of course, as indicated above, the extent of coverage and the position of cameras may vary in different installations. However, one camera (FIG. 3) may provide a dynamic view of the vendor and the surrounding transaction area. An additional camera (FIG. 2) may be used to concurrently provide still images, for example different brands of a particular product to offer a comparison. The camera or cameras generally mount on top of the operator terminal and may feature a fixed focus lens and an in-field indicator to ensure consistent positioning and image quality. The cameras are adjustable and as a consequence may zoom, pan, tilt and freeze frame with reference to a subject. Thus, considerable flexibility is afforded in presenting a view of the vendor location. The ability to accommodate the various vendor communication capabilities is a significant aspect of the present development. Note that cellular telephone techniques may be employed in relation to the locations L1–Ln, as for example, the cameras might be backed up by a cellular phone arrangement to function in the event of a telephone line severance. Battery backup, of course, is contemplated.

To consider the operation of the embodiment in somewhat greater detail, reference will now be made to FIG. 2 in which previously identified components bear similar reference numbers, generally showing a more detailed configuration of each operator or buyer terminal. Accordingly, the dial-up telephone system (center) is designated TS, representative vendor locations (left) are designated AT1, VP1, VS1 and VD1 and a central system is designated as CS.

Recapitulating to some extent, the dial-up telephone system TS accomplishes communication between a central system CS and individual vendor locations. In the illustrated embodiment, to schedule appointments, communication may be initiated from any of the vendor locations. Subsequently, buyers initiate communication with specific vendors in accordance with scheduled appointments at the appropriate times. Typically, the central station CS initiates contact with the vendor locations L1–Ln in sequence (predetermined, such as when scheduled, or randomly, in some instances) to afford communication and viewing of vendor locations for the predetermined interval of time, as scheduled.

As illustrated, different vendor locations may have different communication capabilities as represented by AT1 for analog telephone communication capabilities, VP1 for videophone capabilities, VS1 for static video system capabilities and VD1 for digital video capabilities. The videophone terminal VP1 may be one available from AT&T, such as the Videophone 2500, or one available from MCI. A form of the digital video system VD1, for example, the NCR PVS-70 system also is available from AT&T/NCR and is recognized to provide high quality images. The static video system VS1 may be AT&T's PICASSO™ still image phone, which transmits "picture perfect" still color images and voice simultaneously in just a matter of seconds. By pushing a button on the PICASSO™ phone, a still image for a camcorder or electronic camera may be captured and, by pushing another button, that picture may be transmitted to another PICASSO™ phone. Such a video static system connects to standard analog telephone lines and is compatible with a wide range of video technology used in daily communication and industry standard camcorders, electronic cameras, mouse devices, document scanners and photo CD players. Accordingly, full-color images, virtually of any type, size or dimension may be transmitted for display on a TV, LCD panel, PC monitor or video monitor. Images may be stored or printed using a PC interface.

Specifically, the representative operator terminal V1, coupled to the central system CS has been shown in detail. Of course all the operator terminals may be similarly configured. Audio and video signals from the vendor locations are provided through a telephone computer control and interface system 28 to the operator terminals V1–Vn incorporating videophone encoder-decoder (CODEC) chip sets. Note that different videophone systems, rely on their own proprietary codecs, sometimes more then one as an option. A form of the interface unit 28 is treated in detail below. Generally, the unit has the capability to accommodate videophone operation along with telephone switching and a variety of control functions.

The computer control and interface system 28 also is connected to several operating devices including an auto dialer 30, a memory 32, a "D" channel signal processor 34, an audio response unit (ARU) 36 and a caller test unit 38. These structures are disclosed in somewhat greater detail below; however, the auto dialer 30 may take any well known form of such units as may the memory 32.

The computer control and interface system 28 is further connected to the clock 40. The clock 40 controls scheduling operations. For example, updates or changes to appointments, such as cancellations, may be remotely implemented and forwarded to the appropriate buyer by facsimile. In addition, as indicated by an associated live operator station 42, calls from vendors to schedule calls or, alternatively, calls from buyers initiating appointments, may be transferred to a human operator in the event there are complications with the automatic response units or message recording equipment or in the event callers are calling from a rotary telephone.

As indicated above, flexibility to accommodate various vendor equipment configurations is an important aspect of the central system CS. Specifically, the buyer operator terminals V1–Vn, as illustrated by the operator terminal V1, include a format switch unit 41, to switch between videophone circuits 48, static video circuits 50 and digital video circuits 52 for driving one or more monitors. Video monitors: VM1 and VM2 (coupled to cameras 54 (C1) and 56 (C2)) variously facilitate dynamic motion images and still images. The format switch unit 41 can switch a single analog line 39 to couple to either videophone circuits 48 or static video circuits 50 or a digital line (or lines) indicated at 39a to couple to digital video circuits 52 along with a single one of the cameras 54 (C1) and 56 (C2). Note that two lines are typically required for digital video, one for audio and one for digital data. Alternatively, the audio line may also serve as the single analog line.

A video recorder (VCR) indicated at 35 is also provided, which may be set to record continuously or intermittently to provide historical data for subsequent reference when conferring with a supervisor or refreshing the memory with respect to specific features. Alternatively, a video printer also indicated at 35 may be used. On receiving a request command, for example from the central station CS, the video recorder 35 may record compressed video signals of the display images. Of course, continuous recording by the video recorder 35 may be suspended when desired.

At locations where two cameras are positioned, a single video recorder 35 may be connected to the multiple cameras via a switching device (though shown as an integral part of the video recorder 35, may be separate therefrom) to control and sequence the recordings from the cameras. A switching device such as the intelligent sequential switcher manufactured by SONY, as Model No. YS-S100, may be used to control and sequence multiple recordings. In addition, although block 35 does not specifically indicate plural video recorders, separate video recorders for recording images transmitted on digital or analog lines may be connected.

Alternatively, in some situations select frozen frames of viewings of vendor products or a specific time period of each viewing of a vendor product may be recorded on a VCR or printer using a video printer, for example two seconds (specific time period) of a twenty minute appointment for each vendor location. Such video printing may be obtained both by buyers and vendors.

Likewise, the operator terminal V1 may incorporate a standard line printer also indicated at block 35 for providing a printed record of predetermined vendor communications, e.g., indicating the date, time, location, period of appointment etc. Thus, a detailed hard-copy record is available when desired.

At this stage, consider an initial phase of a vendor scheduling an appointment. In that regard, select vendors are given advance notice of calling numbers and operating instructions. Accordingly, consider an exemplary operation sequence from the vendor location L1 (FIG. 1), or terminal AT1 (FIG. 2). Thus, the vendor initiates dial-up operation with the central system CS to schedule an appointment with the specific buyer. Accordingly, connection is established with the central unit CS. Data related to the call is indicated by Dialed Number Identification Signals (DNIS) utilizing facilities readily available and provided by the dial-up telephone system TS through the so-called D-channel or in-band signalling apparatus. Thus, the central system has a basis for determining if the vendor is entitled to make an appointment with a specified buyer. A PIN number entered by the vendor may also qualify a caller (vendor).

The dial-up telephone system TS also provides Automatic Number Identification (ANI) signals indicating the calling number on the so-called D-channel or in-band signalling apparatus. In the present disclosed embodiment, such signals identify the remote vendor location L1 to the central system CS. The memory 32 may provide alternate forms of calling signals, commanding a specific outgoing line from the telephone interface and control unit 28 to afford additional communication. Specifically, for example, ANI signals might command various related data from the memory 32. Thus, an appointment may be scheduled for execution at a later time as explained in detail below.

As an alternative to simply scheduling an appointment, assume that the caller is at the VP1 buyer terminal and wishes to initiate video contact with a specific buyer. Upon attaining communication, the call may be processed to the buyer terminal V1, at which appropriate videophone communication is provided with the vendor. Specifically, video monitors VM1 or VM2 are compatible to receive videophone signals through the dial-up telephone system TS and the interface system 28 to manifest images in the form of a scene and graphics and in some cases audio signals. Concurrently, the appropriate circuit 48, 50, or 52 is activated through the switch 41 for compatible operation with the calling video equipment.

Whether the conference is implemented as a result of a direct call from a vendor, or is the result of a scheduled appointment, in accordance with the present development, the selected operator terminal V1–Vn is formatted to a configuration compatible with the vendor terminal. In that regard, the terminal AT1 simply accommodates audio and digital signals and is representative of such terminals for use to schedule appointments, as in an ARU interface. Alternatively, person-to-person communication is available through the operator station 42.

The videophone terminal VP1 is representative of such units to provide one form of audio/video communication with one of the terminals V1–Vn. During such communication, the switch 41 is actuated to activate the videophone circuits 48 to function in cooperation with one of the monitors VM1 or VM2, and one of the cameras 54 (C1) or 56 (C2). Thus, compatible communication is implemented for each outgoing call, utilizing data from the memory 32.

For communication with static video systems (Picasso™ units) as represented by the terminal VS1, the switch 41 actuates the static video circuits 50 for compatible operation of a camera 54 or 56 and a monitor VM1 or VM2. Note that particularly effective operations may involve combination formats, for example, a videophone and a static video system. Specifically, with both of the circuits 48 and 50 operative, the camera 54 and the monitor VM1 may function in a videophone format to accommodate effective personal communication between a buyer and a seller. Concurrently, the camera 56 and the monitor VM2 operate in a static video format to effectively exhibit a vendor's product. Additionally, a mouse 51 at the terminal VS1, controls a cursor in the display of the monitor VM2 further enhancing communication. A mouse such as the one indicated at 51 may also be provided at the buyer terminals V1–Vn. Again, the switch 41 controls the operations to attain the compatible format.

To further illustrate the possibilities, the terminal VD1 is representative of high fidelity (hi-fi) telephonic video systems using digital lines for higher resolution dynamic displays. As with respect to the other formats, the switch 41 selectively actuates the compatible circuits, the digital video circuits 52 to drive a selected combination of camera and monitor, e.g. camera 54 and monitor VM1.

It may be seen that the video platforms or terminals V1–Vn offer considerable flexibility in accommodating multiple audio-video formats. Convenience is served by the multiple format capability of the cameras 54 and 56 along with the video monitors VM1 and VM2.

Figure 9:
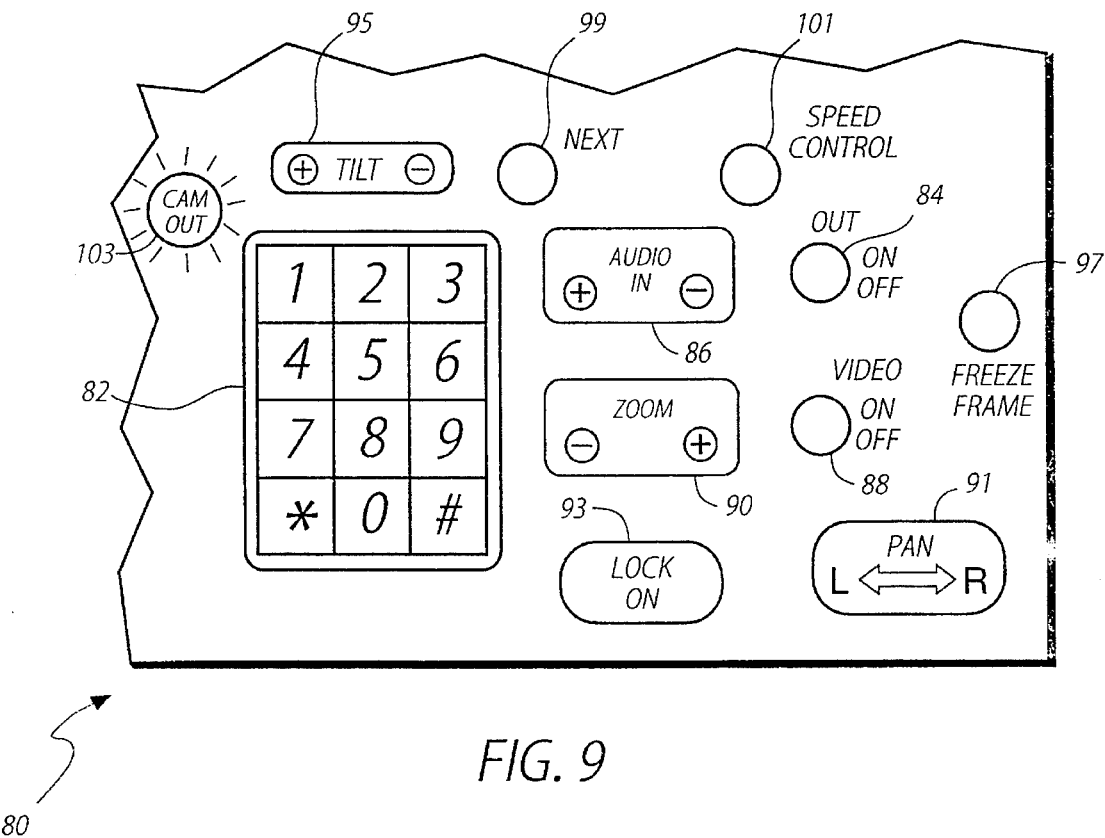
FIG. 9 is a graphic representation of a portion of the control panel of an element in the system of FIG. 3.

Recapitulating, the terminal V1 has been described for communication with the various equipments at locations to include a video location for display. In addition to the display, each of the terminals V1–Vn incorporates a handpiece 46H or equivalent, and a substantial control panel that may be a telephone pad 46P or embodied as part of a personal computer keyboard. Note that the handpiece 46H is illustrated simply to emphasize audio communication. In any event, the control panel for each terminal V1–Vn includes the current controls for an operative video format, plus dedicated controls relating to the disclosed system. In that regard, in the interest of avoiding undue complications, only a fragment of the representative panel 80 for the terminal V1 is shown in FIG. 9.

Generally the panel 80 affords considerable control, including the use of keypad tone signals (DTMF) to perform control operations at both ends of a communication. Specifically, the fragment of the panel 80 of FIG. 9 incorporates a traditional twelve-button telephone pad 82 bearing the numerals "1" through "0" along with the symbols "*" and "#". The designated buttons each generate a distinct DTMF signal in accordance with extensive practice, which signals are communicated to all connected terminals.

Various other specific controls are provided on the panel 80. An on-off button 84 controls outgoing audio. A toggle 86 controls the volume of incoming audio. An on-off switch 88 controls video at the terminal. A pair of toggle switches 90 and 91, respectively, control zooming and panning camera operations. A push button switch 93 serves as an interrupt for locking onto the current display (high quality freeze frame) for closer observation or to record data and in some cases higher resolution images for closer observation at a later time, for example, by use of a video printer.

Generally, buyer terminals may be connected to a single analog line at each of the terminals for initiating predetermined scheduled outbound video calls to a plurality of vendor locations, the buyer terminals providing dynamic analog video display signals, and having the capability of locking on a video display and obtaining a high resolution freeze frame. In addition, another toggle switch 95 controls tilting camera operations and a push button 97 advances the freeze frame for subsequent observation or reverses it back to a dynamic display. A push button switch 99 serves to manually terminate the call. A control switch 101 regulates resolution of the display. Finally a signal lamp 103 illuminates to indicate the next appointment.

Typically, it is likely that buyers will place, or cue the placing of appointment calls. However, recognizing that communications to the terminal V1 (FIG. 2) can be variously initiated, the control panel 80 enables various commands. Generally, by using the telephone keypad 82 on the panel 80, various control functions can be accomplished as indicated by the following chart.

CHART 1

| Command | Name | Operation |
|---|---|---|
| 40 | Camera | Designates a camera command is to follow |
| 41 | Camera C1 | Sets camera C1 active |
| 42 | Camera C2 | Sets camera C2 active |

CHART 1 -continued

| Command | Name | Operation |
|---|---|---|
| 50 | video | Designates a video command is to follow |
| 51 | videophone | actuate videophone operation |
| 52 | static | actuate static video operation |
| 53 | digital | actuate digital video operation |
| 54 | clear | clear actuated video operation |
| # | Execute | Execute entered command |
| * | Clear | Clears any entered or partially entered command |
| 11* | All Clear | Clears all commands to receive fresh operating commands |

To illustrate, consider a circumstance. In viewing a display on the screen, the video may be lost or the buyer at the terminal V1 (FIG. 2) may wish to concentrate on a specific product. For example, it may be desirable to actuate the display of camera C2 to provide still images of the product. Accordingly, the keypad 82 is actuated first by touching buttons or keys "4" and "0" followed by the numerals "4" and "2" to actuate the camera C2. As a result, the display of the video screen is shifted to a view of the product.

To consider another control operation, observation of the display on the screen may suggest that some further audio communication may be desirable from the video terminal V1 to the vendor location L1. Initially, the audio "on-off" button 84 (FIG. 9) would be actuated to initiate audio communication.

Still another control operation involves video coordination. For example, in accordance with a program, a conference might be initiated in a videophone format with the terminal V1 (FIG. 2). Accordingly, the videophone circuits 43 are active to drive one of the video monitors VM1 or VM2 (say VM1). At some point, assume the conference participants decide to add a static video communication. A command of "52" in touch tones on the panel 46P (see FIG. 9, pad 82) initiates a series of operations. Specifically, another line connection is established by actuating the autodialer 30 (FIG. 3), then static video circuits are actuated. At the terminal V1, the static video circuits 50 are actuated to drive the monitor VM2. As a result, a buyer at the terminal V1 can confer with a vendor, speaking face-to-face through the camera 4 and the monitor VM1, while the vendor exhibits fine details of a product on the monitor VM2 in a still image. Of course, in sequences of such still images, views can be changed and areas highlighted with a cursor controlled by the mouse 51.

As an alternative to actuating the static video format, the conferees may elect to go digital. A command "53" from the panel 46 sets the requisite steps in motion. The autodialer 30 dials up a digital connection, then using that connection, the switch 41 actuates the digital video circuits 52 to drive one of the monitors VM1 or VM2. Note that with enhanced hi-fi video communication, the assumed videophone communication might best be terminated.

In view of these examples, it will be apparent that the operator at the terminal V1 has substantial control, including the ability to go from one video format to another. Of course, such operations presume that the vendor has the requisite capacity, which may be indicated in the graphic display as treated in greater detail below.

Note that after each command is issued, the operator must touch the numeral or pound symbol ("#") button to execute the entered command. To clear any entered or partially entered command, without execution, the operator simply touches the asterisk ("*") button. Finally, totally clearing the operating commands involves touching the code: "1, 1, *."

With the system in a cleared state, any of a variety of operational commands may be given, for example, a partial list of such commands is:

CHART 2

| Command | Name | Operation |
|---------|------|-----------|
| 20 | Op. Comm. | Operational commands to follow |
| 21 | Pre. Seq. | Revert to sequencing a predetermined program of vendor locations at the designated times |
| 22 | Rand. Seq. | Revert to sequencing a random program of vendor locations for follow-up calls |
| 23 | Set Call | Dial-up a select vendor location as identified by a four-digit number to follow |
| 24 | Billing Terminal | Actuate connection to Billing Terminal |
| ׀ | ׀ | ׀ |

As an example, touching the keypad 82 (FIG. 9) to enter "2" and "0" indicates an operational command follows. Thereafter, entering "2" and "1" prompts the system to revert to a sequencing operation as described above in accordance with a predetermined program scheduling communication and monitor displays of individual remote locations. Note that sequencing may take the form of graphically notifying the buyer, for a command to initial the next conference.

For some situations, where random calling is desired, entering the numerals "2" and "2" initiates another form of sequencing in which the control computer provides a random program (within limits) to randomly connect to remote vendor locations perhaps for two minutes each. Note that dwell time may vary widely or be programmed for individual vendor locations L1–Ln.

As other operating examples, entering the numerals "2" and "3" indicates that the operator will next enter a four-digit number designating a particular remote location, thereby providing a memory location address from which a telephone number for the location will be fetched and employed to actuate an automatic dialer as described below. Finally, as another example, indicated in the above chart, actuating the keypad 82 (FIG. 9) to enter the numerals "2" and "4" establishes connection with the billing terminal 14 (FIG. 1), thereby bringing such a facility into communication with the system in various arrangements.

From the above descriptions, it is apparent that the disclosed system utilizes videophone technology in combination with other telephone system technology along with computer control and graphics technology to accomplish effective scheduling and processing of visual conferences as well as active involvement in such conferences. To explain the system in greater detail, the structural components now will be considered from a different perspective. That is, FIG. 3 illustrates the central station equipment in a somewhat different perspective than FIG. 2, again, central components operate in cooperation with a plurality of operator or station terminals V1–Vn to schedule and process calling operations. FIG. 2 primarily illustrates the scheduling operation of the system for vendor appointments and the multiple format video circuit operation under switch control.

Referring to FIG. 3, as described with reference to FIG. 2, each of the video terminals V1–Vn are connected to a control unit, specifically in FIG. 3 to a control system 44 that is in turn connected to an auto dialer 46, a memory 32 and a video audio recorder 50 (video and audio capability). Essentially, these units (and others) are time shared by the video station or terminals V1–Vn. In that regard, capability may be provided in the control system 44 to transfer connections to locations L1–Ln as between the terminals V1–Vn. For example, in that regard, operators (buyers) at the terminals V1–Vn may be specialists for certain goods with designated calls from specific vendors routed to specific terminals and transfer capability to accommodate changes in situations.

As explained above, the exemplary control system CS functions to initiate outgoing calls as well as receive and process incoming calls. To continue with the explanation of an incoming call from a vendor to schedule an appointment, when the telephone interface 28 (FIG. 2) receives an incoming call, it may be connected to either the operator station 42 or the audio response unit 36. Concurrently, incoming data signals (DNIS and ANI) are provided for control and/or information. From the memory 32, the control computer 28 fetches the identification of the vendor location L1. With such signal represented data, one or more buyers are identified with whom the vendor or vendor organization is entitled to schedule an appointment.

Continuing with reference to FIG. 3, a plurality of individual terminals or monitor work stations V1–Vn (for buyers) for interactive conferences are represented at the bottom of FIG. 3. Again, as the terminals are generally similar, only V1 is shown in any detail. As indicated above, the terminals V1–Vn are collectively served by the other apparatus of the central system, also as illustrated in FIG. 3.

Figure 2:
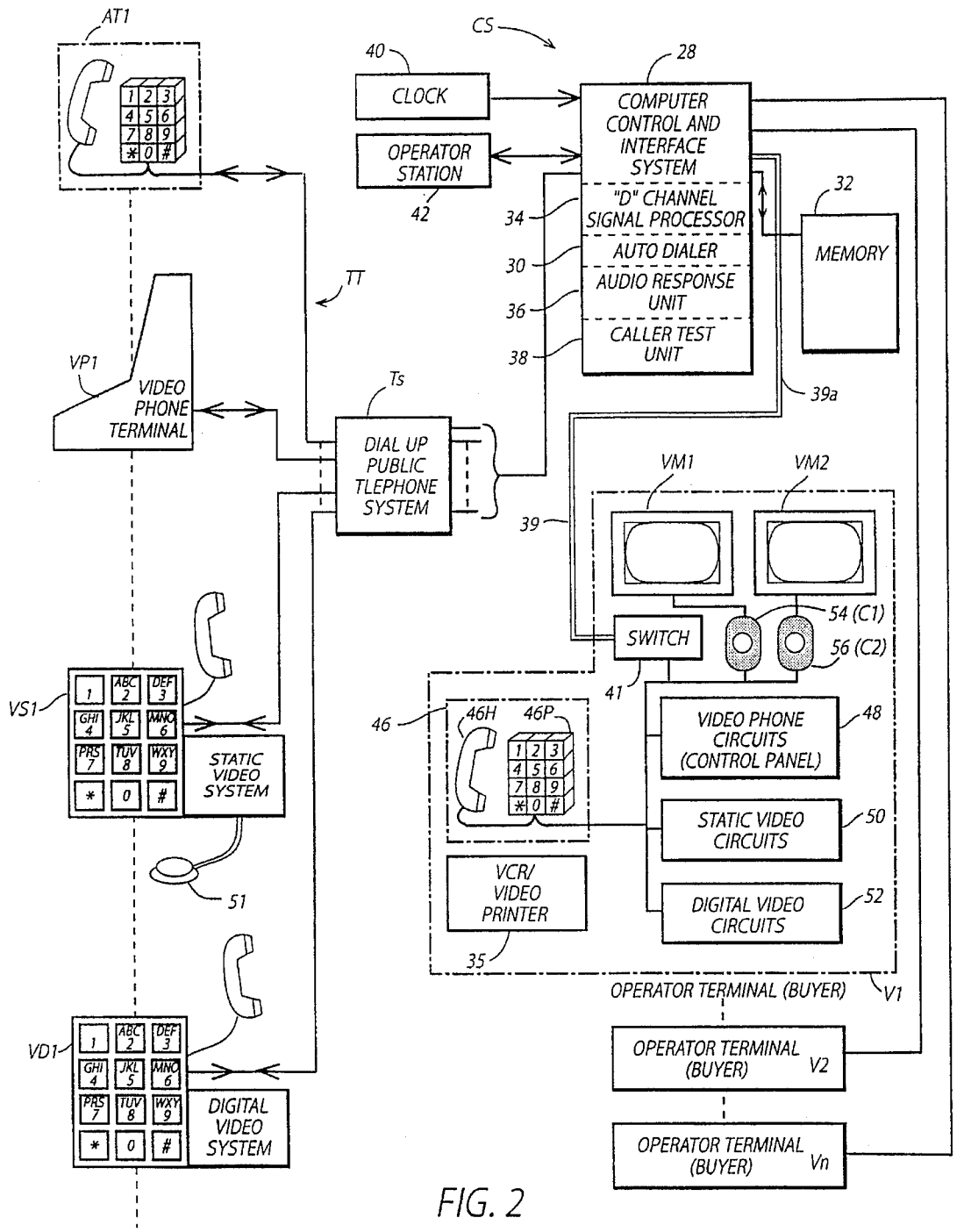
FIG. 2 is a more detailed block diagram, showing the basic components in one exemplary buyer terminal.
Figure 3:
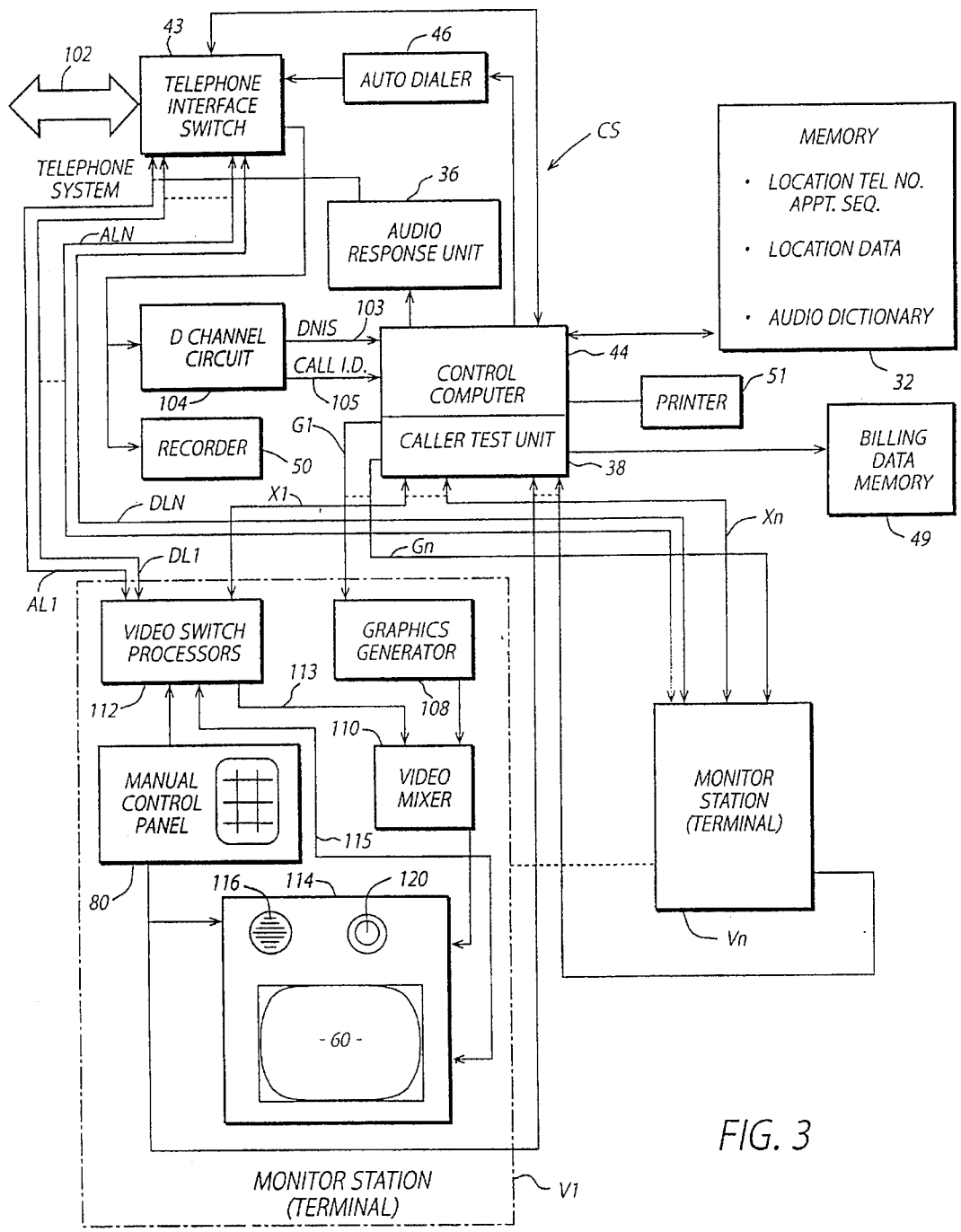
FIG. 3 is a more detailed block diagram of the basic components in an exemplary system of the present invention illustrating audio, videophone, static video and digital video communication techniques.

To accomplish a complete understanding, the explanation of the central system of FIG. 3 now may best be pursued by somewhat concurrent consideration of FIGS. 2 and 3 recognizing the different perspectives. While FIG. 2, primarily illustrates the various possibilities for vendor terminals, and the capability of the central station, with terminals V1–Vn, to accommodate such capabilities, FIG. 3 illustrates system control structures and graphics display apparatus. To proceed, certain circumstances will be assigned to describe the attendant operations concurrently with the introduction of any fresh components. Accordingly, inbound calling operations initially will be treated followed by a comprehensive treatment of outbound calling procedures.

In accordance with one mode of operation, assume the practice of vendors calling for appointments with buyers. In accordance with such calls, an appointment schedule develops for each of several buyers. The system then implements the schedules for video conferences with all the flexibility and convenience as disclosed herein.

To schedule an appointment, a vendor may use virtually any form of telephone instrument or terminal including any of the units AT1, VP1, VS1 or VD1 as illustrated in FIG. 2. The unit AT1 is sufficient either for a telephonic-computer interactive call or a direct operator call (station 42) to accomplish an appointment.

Initially, as described above, inbound calls initiated by vendors or a remote telephonic interface appointment scheduling system are received through the telephonic interconnection 102 (FIG. 3, upper left) accommodated by the interface telephone switch 41 as well known in the art. The information signals accompanying calls (ANI and DNIS) are passed to a D-channel circuit 104 as for decoding. That is, as indicated above, the calling number signals (ANI) identify the calling remote location. The called number signals (DNIS) may indicate the particular buyer, buyer organization etc.

Information carried by the ANI and DNIS signals is supplied from the circuit 104 (FIG. 3) to the memory 32 (upper right) through the control computer 44. Specifically, a line 103 carries the information (DNIS) while a line 105 carries the call identification (ANI-Caller I.D.). Consider the ANI processing initially, specifically in relation to stored data as illustrated in FIG. 4.

Figure 6:
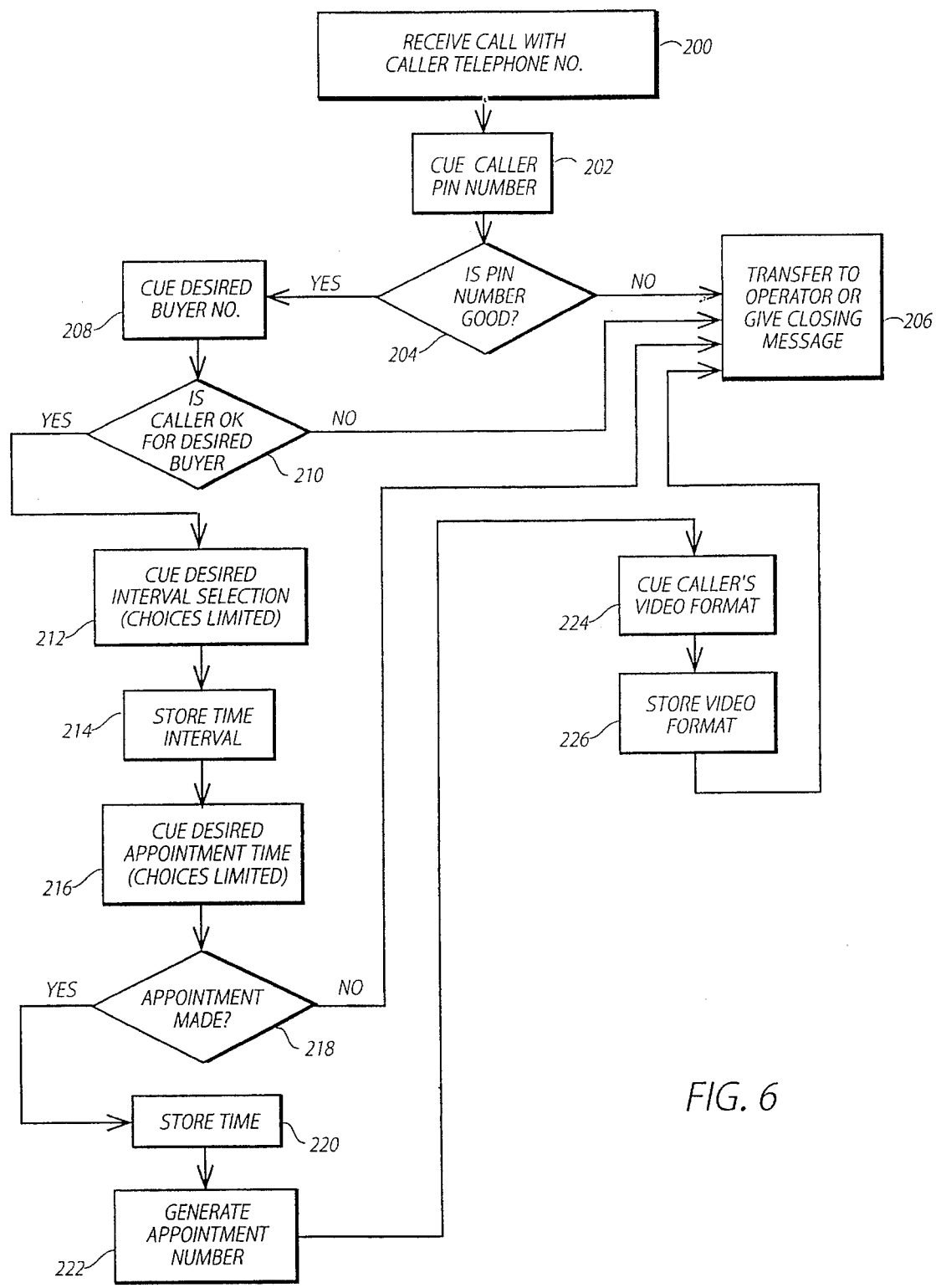
FIG. 6 is a logic diagram illustrating an exemplary operation format of the system for scheduling appointments.

Referring now to FIG. 6, with the initiation of a call, indicated at block 200, the central station receives "D" channel type signals, for example, including automatic number identification (ANI) for the calling number. Responsive to the ANI signals, the system fetches a cell from the memory 32 (FIG. 3) for the execution of a preliminary routine by the audio response unit (ARU).

The illustrated operation continues at block 202, where after a greeting, the audio response unit 36 cues the caller, requesting a personal identification number (PIN number). The cues may simply take the form: "Please enter your personal identification number."

At query block 204, the PIN number entered by the caller is received in the computer 44 for test by the unit 38. That is, the entered PIN number is compared with a stored PIN number (FIG. 4, cell 70) to determine if the PIN number is accurate and to confirm that the caller is authorized.

If the number is improper, indicated by a prompt "no" (FIG. 6, block 204) the call may be terminated as indicated at block 206 or another opportunity may be afforded. Ultimately, the call may be terminated with a closing message or the call may be transferred to an operator.

With entry of a proper PIN number, operation continues at block 208 where authorized callers are next cued to identify the buyer with whom they wish to schedule an appointment. For example, the cue might simply take the form: "Enter the identification number for the buyer with whom you wish to schedule the appointment."

At query block 210, with the identification of the buyer, a computer check (FIG. 3, test unit 38) determines the availability of the buyer to the caller as specified in the vendors cell 70 (FIG. 4). If the caller is authorized to schedule appointments with the identified buyer, the interface proceeds under control of the computer 44, through a menu to schedule the time period desired for an appointment as indicated by block 212. For example, the caller (vendor) might be cued: "If you desire an appointment of 15 minutes, touch the pound key, if you desire an appointment of one half hour, touch the star key and if you truly believe one hour is required, touch the one key." Once the time period is specified, that information is stored in the memory 32 (FIGS. 2 & 3) as indicated by block 214. Specifically, the data is stored in a buyer cell 72 (FIG. 4). In addition, priority status may be asserted as indicated by the vendor's PIN number. Note that the memory 32 also may store data as a basis for reports to buyers. Such reports may include comparisons:, summaries, and analysis of exchange carriers call data and appointment scheduling files with associated vendor phone numbers.

The system may require qualification for vendors or schedule appointments of longer duration. For example, the system may limit appointments of longer duration to select vendors. However, pursuing the appointment menu as indicated at block 216 (FIG. 6), the interface may continue as by cuing the caller with a multiple choice of three appointment times from which one may be chosen.

At query block 218, a query is set forth to determine if the appointment is made. A prompt "no" terminates the call at block 206. A prompt "yes" stores the appointment time in the memory 32. Specifically, as indicated above, the appointment is stored in the buyer cell 72, as illustrated in FIG. 4. The storage step is indicated at block 220 in FIG. 6. With the appointment time and period or interval established, for example, May 12, 1992, 3.45 pm, the appointment is assigned a number at block 222. In that regard, generally vendor cells in the memory 32 may be accessed by appointment number as well as the telephone number. Once the appointment number has been assigned, a caller may be cued for video format information, for example, to determine the caller's video format capabilities as indicated by block 224. Of course, if the video format data is already of record in the vendors cell (see FIG. 4, vendor cell 70) the step may be deleted. Otherwise, the video format information is stored as indicated at block 226.

As indicated, the scheduling operations may be void of video communication, rather relying on computer interactive operations. Accordingly, the D-channel signals are operative primarily for identification and/or information. On the contrary, for video operation, data is addressed for supplemental graphics display. Specifically, from the control computer 44, the representative ANI signals address the memory 32 to fetch detailed graphic information, specifically the identification data indicated generally as a buyers cell 72 as illustrated in FIG. 4. A signal represented form of such data is supplied from the control computer 44 through one of a series of graphic lines G1–Gn to a selected one of the monitor stations V1–Vn.

Returning to FIG. 3, within the station V1, the graphic identification signal data on a caller is received by a graphics generator 108 for processing into a video signal that is supplied to a video mixer 110. The output from the video mixer 110 drives a monitor 114 to provide a scene-graphics display.

As a concurrent operation with the ANI signal processing, the DNIS signal representation also is applied by the control computer 44 to the memory 32 for fetching an indication of the particular location (vendor). Signal representations of the vendor also are supplied from the computer 44 to the graphics generator 108 and produce a display representation (see vendor data 70, FIG. 4). Thus, the video mixer 110 receives comprehensive graphic signals for display concurrent with the picture scene representation, the signal source of which will now be considered.

As an alternative to the operation involving scheduled appointments, under certain circumstances it may be desirable to allow vendors to establish video communication with buyer terminals by direct dialing. Of course, calls may be conditioned by various tests or simply accepted. In any event, upon the completed telephonic connection from the remote location (FIG. 1), as assumed above the specific incoming line is coupled to the monitor station V1. Specifically, the signals are received by a switch and processors, indicated at 112 (FIG. 3) for driving the video monitor 114 incorporating the display screen 60. Specifically, the video switch and processors 112 are coupled to the video mixer 110 to provide the scene content of the display along with graphics.

The video switch and processors 112 may incorporate a variable codec for analog lines AL1–ALN and digital lines DL1–DLN. For analog lines, a video CODEC along with computing capability may take the form of an AVP1000 video CODEC chip set as available from AT&T. Essentially, the CODEC chip set accomplishes videophone operation and consists of a video encoder, a video decoder and an internal system controller.

As known, the system controller provides and receives: video data, audio data and data signals. In that regard, the switch and processors 112 is illustrated with cable (multiple path) connections. That is, path or line AL1 is one of the series of lines AL1–ALN carrying an encoded videophone signal between the switch 43 and the video switch and processors 112. A line 113 then carries received video data to the video mixer. A line 115 (bus or cable) carries several other signals to the monitor 114, specifically, transmitted and received audio, transmitted video and data signals. The video switch and processors 112 (including circuits 48, 50 and 52, for example as shown in FIG. 2) also is connected to the control computer 44 for data signal flow.

Figure 7:
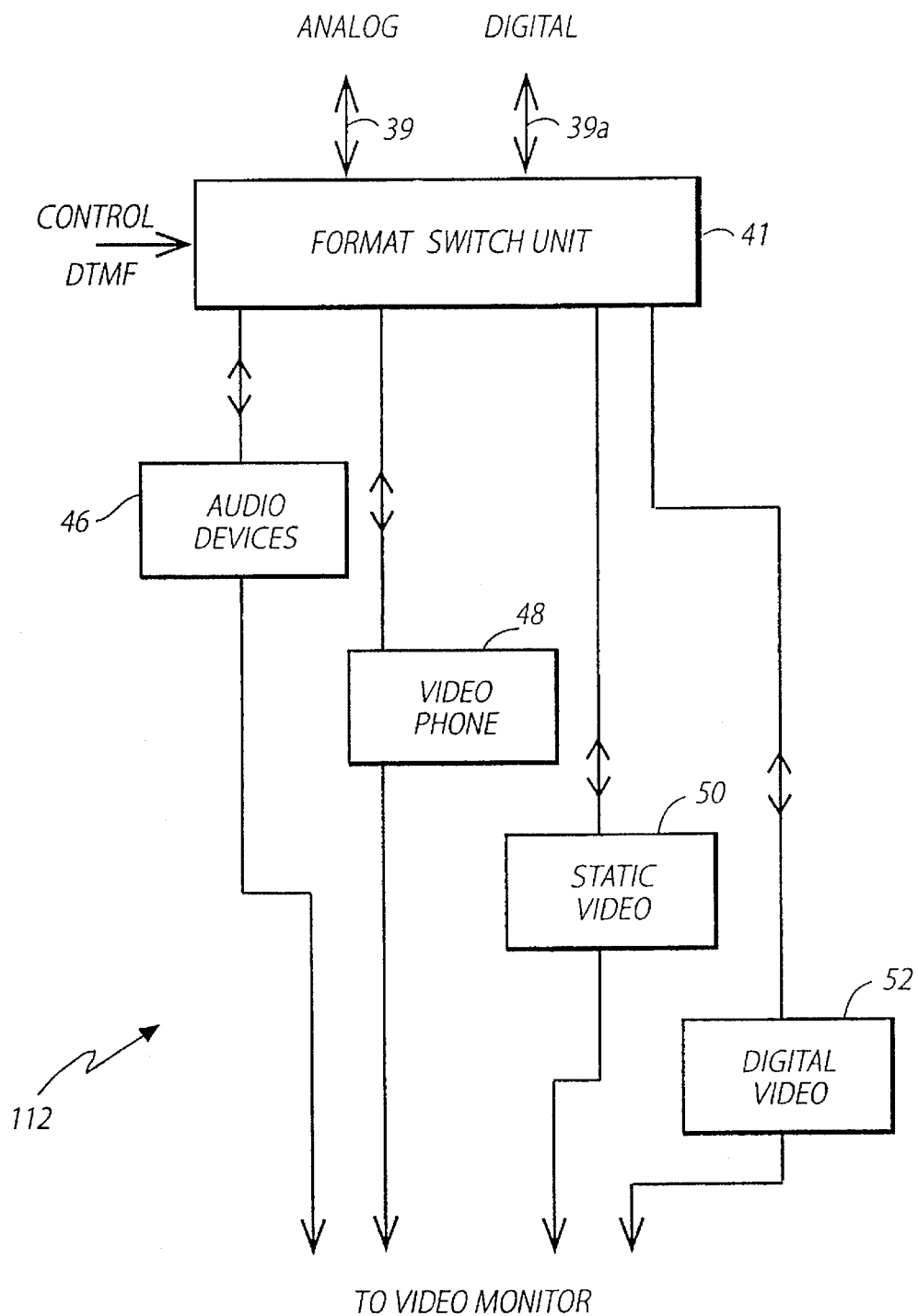
FIG. 7 is a block diagram illustrating a format switch unit facilitating provision of, and switching between audio, videophone, static video and digital video communication techniques.

Referring now to FIG. 7, the format switch unit 41 is coupled between a standard analog line and a line on ISDN and an audio device 150, a videophone processor or circuits 48, a static video processor or circuits 50 and a digital video processor or circuits 52. Upon placing a call to a videophone unit, the format switch unit 41 selects the appropriate line, that is, the analog line. Alternatively, upon placing a call to a high fidelity video (digital), the format switch unit 41 selects a digital line. Also, as described above, during visual communication, a buyer may make switches, e.g., from transmitting dynamic images over a single analog line to high resolution freeze frames. The high resolution freeze frames may be viewed on large 14 inch monitors. Further, the images may be manipulated from either end to view the freeze frame image concurrently.

In addition to the display screen 60 (FIG. 3), the monitor 114 incorporates a speakerphone 116 and a video camera 120 (also indicated in the embodiment of FIG. 2 as 54 (C1) and 56 (C2)). As indicated above, signals from the speakerphone 116 and the video camera 120 are selectively transmitted to a remote location through the line 115 and the video switch and processors 112 under manual control.

Recapitulating to some extent, on receipt of an incoming call, ANI and DNIS data is processed along with the subsequent encoded videophone signal for application to a select monitor station to provide the picture display at a remote location, for example, of the vendor and the graphics (as represented in FIG. 4). Upon such an occurrence, as indicated above, the manual control panel 80 (FIGS. 3 and 9) adjacent the monitor 114 may be utilized to accomplish a number of operations including: changing the status, selecting a particular camera and controlling the zooming or panning of the camera, actuating either audio or video manifestations at the location L1 (vendor), effecting a connection to a third party, and so on. Accordingly, any of a number of courses may be pursued under the control of a trained operator including supplements to the video record as in the form of comments. As indicated above, for example, the operator can command a synthesized voice message to be delivered audibly at the location L1 (vendor). Specifically, voice data is drawn from the memory 32 (audio dictionary), a message is formulated by the central computer using well known techniques of the art and provided to a voice generator 111. The audio output from the voice generator 111 is processed by the switch and processors 112 or, as illustrated, by the telephone interface switch 102. In any event, communication is to the remote vendor location L1.

In the operation of the system embracing the exemplary formats as treated above and below, a record is made for billing purposes. That is, a billing data unit 49 (upper left, FIG. 3) and a standard printer indicated at 51 are controlled by the computer 44, recording all transactions in relation to billing charges. Such data can be variously processed at different times. Basically, the concept involves formulating billing data, so that at least a part of the calls made to a vendor, for example, can be rebilled to that vendor.

In one arrangement, the inter-exchange carrier (e.g., AT&T) provides comprehensive data on calls specifying: phone number calling, phone number called, date, time, length of call (period), billing data and so on. Test or look-up operations are then performed with reference to a vendor data base. Accordingly, portions of the charges (with or without mark-ups) are rebilled (with appropriate identification to the vendors). Such operations may be particularly effective in relation to "private" networks, e.g., the so-called SDN (software defined network), SDDN (software defined data network) which are compatible with ISDN operations, or a combination of the two service offerings (SDN with SDDN). Note that AT&T's SDN is a virtual network service which offers an organization the ability to build a private corporate network within the AT&T public network. A customized database contains information on various sites affiliated with the organization (i.e., the service organization installs a "private" network service at many different business entities) as well as features and routing information. Moreover, SDN encompasses voice, analog data, digital data and image transfer. SDDN is a feature of SDN and is most often installed in conjunction with SDN. A combination of the two provides the capability of combining all the different sites for network management and billing. Note that both buyers and vendors may wish to extend the scope of the network of participants by installing at least one similar mode of video in their branches, plants and/or customers.

Essentially, coordinated with the control computer 44, (see FIG. 4, cell 70) reapportioning and rebilling options are executed by the billing data unit 49, utilizing storage capacity of the memory 32 and the printer 51. These operations involve a supplemental step 158 (see FIG. 5).

To this point, detailed consideration has been primarily directed to the treatment of incoming calls. However, as explained, certain modes involve the placement of outgoing calls under manual control and the automatic operation to implement a sequence of scheduled conferences. Such operations next are treated in detail.

Consider first the functions of the system when an operator (buyer) manually initiates a call from the terminal or monitor station V1 to one of the remote locations, e.g., location L1 (vendor). Specifically, assume the need to establish a connection from the terminal V1 (buyer terminal) to the remote location L1 (vendor) initiated by an operator (buyer) at the terminal V1. Under such circumstances, the operator actuates the manual panel 80 (FIG. 3) using select commands (chart above) as will now be considered.

At the outset, a command "11*" clears the terminal for manual control. Next, a command "20" indicates that operating commands are to follow. The operator next touches "23" to indicate that a specific remote location number will follow. Continuing, the operator touches the four-digit address signal for the location L1 in the memory 32. As a result, the control computer 44 (FIG. 3) addresses the memory 32 to fetch the telephone number for the vendor location L1. The telephone number is supplied from the memory 32 to the control computer 44 which actuates the auto dialer 46 to provide the dial-up signals on an off-hook line provided in the coupling 102 to the dial-up telephone system TS (FIG. 1). Typically, at the location L1 a dedicated line for video operations will accept the communication.

As with all dial-up operations, certain conditions are predetermined. That is, a particular camera (and settings) is specified and a tentative status indicating for example, if the vendor is occupied also is specified.

For most operating systems, it is likely that manual (non-scheduled) operation will not dominate the system. Rather, during much of the time, the monitor stations will collectively be programmed to automatically provide a sequential display of the remote locations L1–Ln in accordance with a schedule of appointments for each caller (buyer). Thus, at the termination of an appointment, a command may be given to indicate availability for the next appointment scheduled. Specifically, as indicated above, a command of "21" actuates the system to the predetermined program of locations. Alternatively, in some instances it may be desirable to place random follow-up calls to vendors simply to leave a message in the event that particular vendor is otherwise occupied. A miscellaneous time period may be reserved for such activity. Accordingly, a command "22" may actuate such a random sequence operation.

During the sequential operation of the scheduled appointments, the control computer 44 (FIG. 3) fetches telephone numbers for the remote locations L1–Ln from the memory 32 in a sequence, actuates the auto dialer 46 accordingly, and assigns the resulting connections to one of the terminals V1–Vn. After a session between a particular buyer and vendor has concluded, the control computer 44 terminates the display connection to the specific one of the terminals V1–Vn in favor of the next waiting connection. A blinking light 103 (FIG. 9) or alternatively, a graphic display of "Five more minutes for the next appointment" may be displayed to the caller to indicate a next appointment. The operation results in a sequential display of the particular locations L1–LN with which appointments have been scheduled at the particular one of the terminals V1–Vn.

Figure 5:
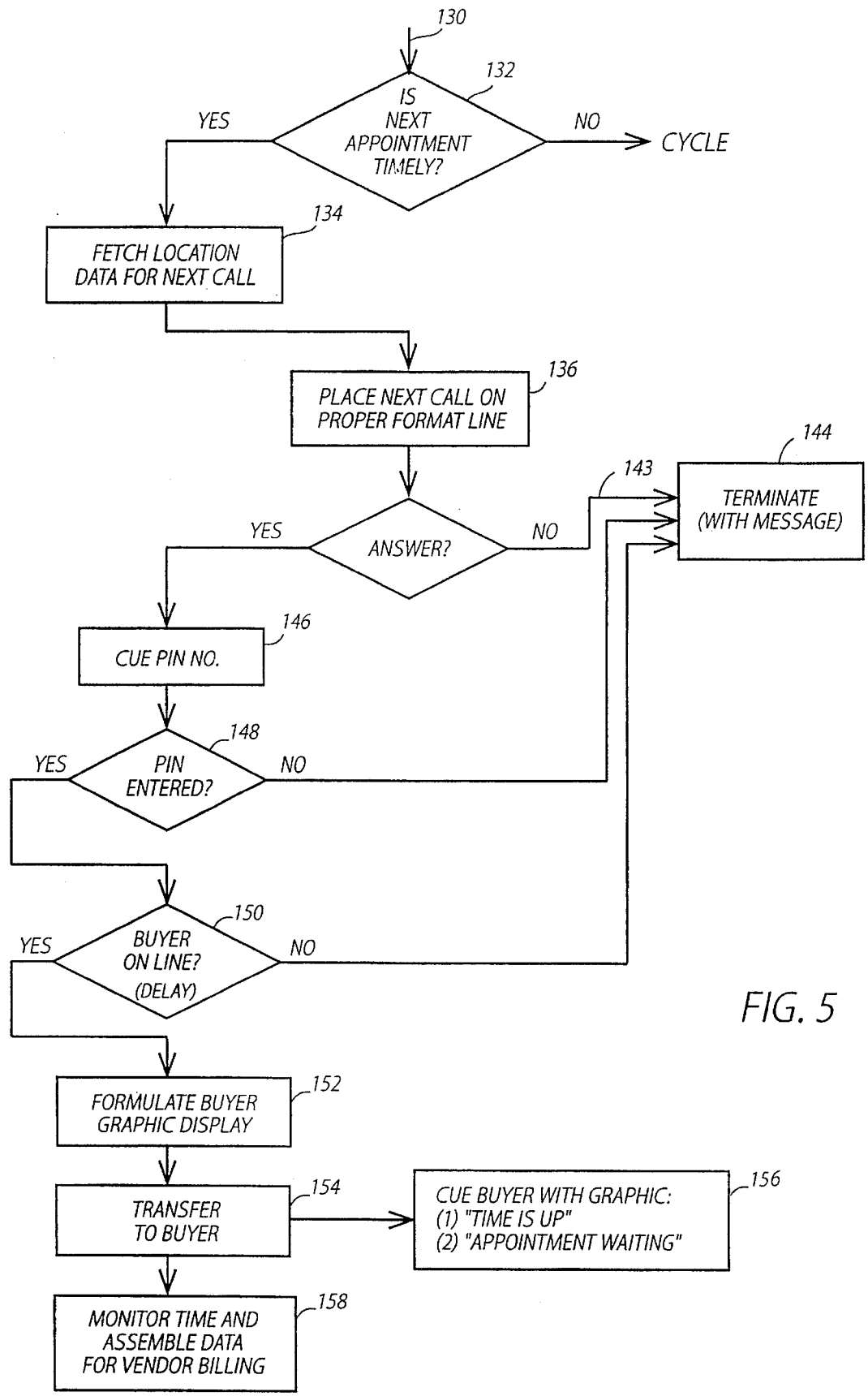
FIG. 5 is a logic diagram illustrating an exemplary operation format of the system for automated execution initiation of scheduled appointments.

A logic program indicating the control operations of the control computer 44 will now be treated with reference to FIG. 5. The program is entered at a line 130 (upper center) shown leading to a decision or query block 132. The query posed by the query block 132 relates to whether or not the next appointment is timely as recorded in the memory 32 (FIG. 3). To that end, in the sequence dial-up operation of the system, the control computer 44 determines with reference to the clock 40 (FIG. 2) whether it is time for initiating the next appointment. Proper time prompts a "yes" path from the block 132 and the process will proceed to a block 134 and pursue a path to fetch location data for the next call. As indicated by a block 136, the next call is placed on the proper format line, depending upon the recorded data (FIG. 4, cell 70) and whether the location being called has videophone, video still (high quality) or hi-fi video capabilities.

The operation then introduces a query as posed by a block 142 to determine if there is an "answer." If there is no answer, as indicated by line 143, the call is automatically terminated after a predetermined number of rings or a predetermined time period has passed. Of course, the call is only terminated after providing the caller with an option of leaving a message, as indicated by block 144. Alternatively, if the call is "answered," a cue for the PIN number is provided as indicated by block 146.

Operation continues with a query block 148 to determine if the PIN number has been entered. The circumstance of "no" PIN number returns the program to block 144 and terminates the call. If the PIN number is correctly entered, the program continues to a query block 150, to determine if contact with the desired remote location is established. Once again, in the event of a substantial delay a "no" is prompted followed by termination of the call at block 144.

Following the alternative "yes" path from the block 150 indicating that the buyer is on the line, advances the program to a block 152. The resulting operation is to formulate the buyer graphic display. As indicated above, in one embodiment, the data is simply addressed in the memory 32 (FIG. 3) by a four-digit number uniquely designating each remote location.

With the available telephone number, the auto dialer 36 is actuated during the interval while the graphics data is prepared for display. Once the buyer graphic display has been formulated, the call is transferred to the buyer as indicated by block 154. Exiting from the block 154, block 156 cues the buyer with cues such as "Time is up" or "Appointment waiting."

Thus, the system accomplishes a sequence of displays representative of the remote locations L1–Ln. As indicated above, a single monitor station may be employed; however, in the disclosed embodiment, several monitor stations V1–Vn share the sequence accommodating interruption either for manually controlled "outgoing" calls or "incoming" calls.

Recapitulating, the above description has treated automatically-actuated incoming calls, manually-actuated incoming calls, automatically-sequenced outgoing calls and manually-actuated outgoing calls, all with respect to a central station CS.

Figure 8:
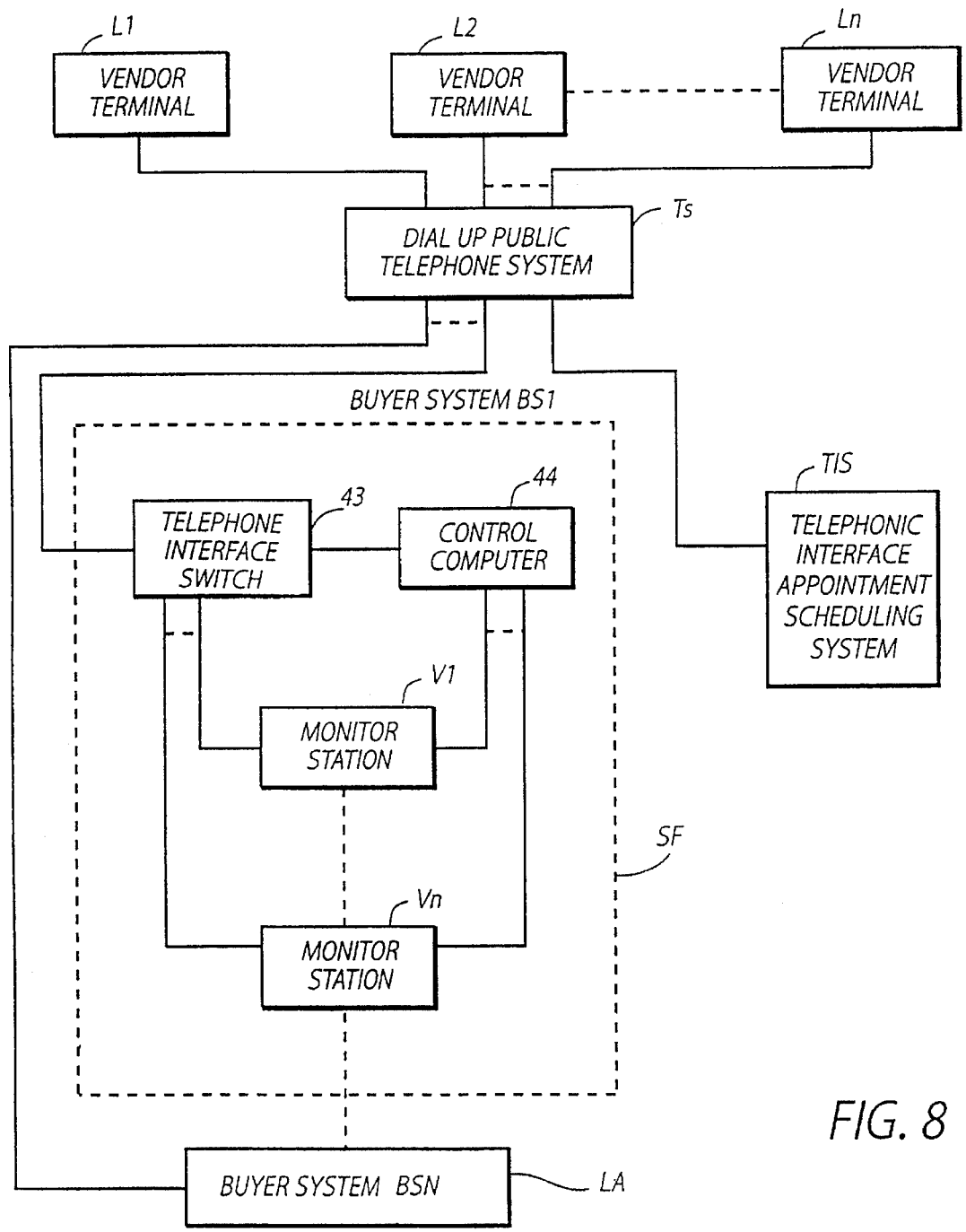
FIG. 8 is a block diagram of the present invention in accordance with an alternative embodiment illustrating a telephone interface appointment scheduling system located remote from each of the buyer systems which are also located in widely distributed locations remote from each other.

In accordance with other exemplary embodiments the system may be physically disposed in different locations. Referring to FIG. 8, multiple operators at multiple monitor stations V1–Vn are illustrated at a buyer station BS1. Other buyer stations through BSN are indicated all operating with a system TIS as will be treated below. However, preliminarily, as explained, FIG. 4 illustrates exemplary storage cells of the central station CS wherein information specific to each vendor and buyer, such as the telephone number, graphic data and additionally, schedules may be stored. For example, a vendor cell 70 may be accessed by the telephone number and address to obtain information such as the vendor PIN number, telephone number, video format and so on. In some formats it may be desirable to designate a rating for each vendor indicating dependability, efficiency at delivering etc. Furthermore, to indicate an established relationship, a designation indicating priority may also be stored to isolate a particular vendor from a plurality of vendors selling similar goods. Of course, the vendor cell may also indicate the vendor's name, any relevant personal information, the company's name, other persons in the conference and so on. Similarly, to some buyers last data relating to the last purchase may also be of importance. In addition, in the event of a remote scheduling and appointment unit interacting with a plurality of widely distributed vendors and buyers, a cross reference number identifying transactions with other buyers may be of importance. Moreover, a record of the buyers available and the time limit for each buyer is also recorded. Similarly, the priority designation or status accorded to a vendor for various reasons and referenced above may alternatively indicate that a vendor has distressed merchandise for sale at discount rates.

It should be recognized that appointment schedules may be revised and updated on site at central stations CS as well as from remote locations. For example, considering a situation where a last minute cancellation or change in schedule is necessary, changes, cancellations or updates to schedules may be requested remotely by vendors and buyers alike. Vendor or buyers may wish to add pertinent information during conferences for storage in the cells 70 and 72.

Referring now to FIG. 8, as noted above, the dial-up public telephone system TS affords effective communication between a plurality of remote locations L1–Ln, and a telephonic interface appointment scheduling system TIS and a plurality of buyer systems BS1–BSn. As indicated and described above, each buyer system located at a buyer's facility includes a telephone switch 41 through which incoming calls are received and outgoing calls are placed. Incoming data signals (DNIS and ANI) are passed to the control system 44, with which the control system may select a specific one of the terminals, for example, monitor station V1 to handle the call. In addition, control system 44 also provides computer graphic signals to monitor station V1 supplementing the coupled television display, for example, a composite display of a scene at location L1 along with appropriate graphic data. In accordance with this embodiment, each buyer system may be located in a distinct location, for example, assume that buyer system BS1 is located in San Francisco and buyer system BSN is located in Los Angeles. Similarly, the telephonic interface appointment scheduling system TIS may be located in another remote location, for example Omaha, Nebr. and is independently managed by a third party.

Figure 10:
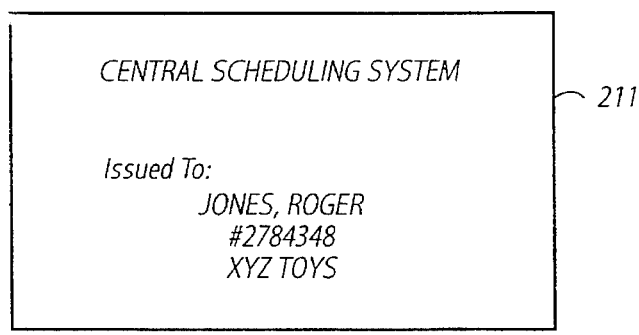
FIG. 10 is an exemplary format of an identification card issued by the telephonic interface appointment scheduling system.

At any rate, different selling and buying companies may register with the telephonic interface appointment scheduling system TIS. At registration, the telephonic interface appointment scheduling system TIS may issue an identification card with a check digit for qualification to each representative of the selling company (FIG. 10). An exemplary identification card is indicated at 211 in FIG. 10. For example, assume that XYZ company has 4 vendor representatives, all located at vendor location L1 equipped with analog capabilities only. Further assume that the telephone number for that location is (212) 555-5555. Accordingly, the scheduling system TIS may assign a identification number and store the following information under that identification number in memory: Jones, Roger, XYZ Toy Company, Analog System, Telephone number (212) 555-5555, Registered to interact with EFG Company (central station number— (310) 666-6666), no priority, IJK Company (central station number—(414) 777-7777), priority with buyer no. 3, Thursday appointments may be offered to vendors with priority status.

To make an appointment, the vendor may initiate dial-up operations with the telephonic scheduling system. An ARU may provide voice cues to the vendor and prompt touch tone input of responses as described above. A single ARU may be used for different organizations, alternatively, different ARU's may be used for different large organizations. The ARU's may include voice mail capabilities for individual buyers. After recording all the information pertaining to appointments provided by the vendors, the scheduling system provides a appointment or reservation numbers to vendors in the event of subsequent cancellation. For example, the vendor may be queried via the ARU if he or she is calling to make or cancel an appointment. If the call is merely to cancel the appointment, the vendor would only need to enter the appointment number.

Note that live operators may take scheduling information and access the scheduling computer TIS to enter appropriate request data processed similar to the automatic features of the system in the event vendors are calling from a rotary telephone or for other reasons. However, the live operators may transfer calls to an ARU to enable vendors to leave voice mail messages.

The scheduling system provides schedule data to individual buyers via facsimile, either automatically or upon request. Alternatively, schedule data may be provided to individual buyers by downloading data onto a computer at the buyer's location typically in batch mode overnight. Recent changes to appointments may be displayed on the buyer's terminal (real time) or forwarded by electronic mail.

At the telephonic interface appointment scheduling system TIS, which may service numerous business entities, several audio response units (ARU) may be used in conjunction with several groups of live operators. To accommodate large numbers of calls, automatic call distributors (ACD) may be utilized to route calls where the different business entities are identified by DNIS.

As a further feature, note that some organizations, for example smaller organizations with only a small number of buyers or vendors may install analog telephone jacks at designated locations on the facility. Thus, fewer monitor stations V1–Vn, may be transported on a cart to the designated locations at the designated times, allowing for use by different buyers. Alternatively, vendors may use the different analog jacks and the cart to display products in various parts of the store by utilizing a camcorder with a long attached cord.

As another example, XYZ drug manufacturer, typically employing "detail" persons, may utilize only a small number of "detail" persons, each located at central stations for two-way visual communication with doctors, pharmacologists or hospital buyers located at remote locations. This allows doctors to call the central station and receive detail information including a usual display of the drugs/packaging etc., relating to new drugs at their convenience. In one embodiment, each subscribing doctor may call a toll free "800" number for information provided to the doctor after qualification. In situations where only one-way communication is required, for example, educational conventions or the like, a caller may simply call in and view (and listen) a speaker at the other end.

It should also be recognized that the buyer terminals disclosed herein may be used by retailers to sell products directly to the persons having units similar to the vendor units described herein in their homes. In such a scenario, ANI may be used to identify a particular household calling, and DNIS may be used to identify a particular product of interest.

In view of the above description, it will be apparent that numerous operating formats, programs and layouts may be accomplished using a wide variety of videophone equipment in cooperation with computing and telephone apparatus. As indicated above, the disclosed embodiments afford some arrangements; however, the scope hereof should not so confined, rather the scope hereof should be in accordance with the claims as set forth below.

What is claimed is:

1. A system for communicating with a plurality of remote locations from a central station utilizing a dial-up telephone facility and telephonic television terminal units at said remote locations, said system comprising:

memory structure for storing call schedule data on said telephonic television terminal units wherein each of said telephonic television terminal units operates in a specific one of multiple video formats;

telephone interface structure for interfacing said dial-up telephone facility to accomplish communication;

at least one central video terminal including a speakerphone unit and a display device for providing television displays in any specific one of said multiple video formats; and computer control structure for receiving calls through said dial-up telephone facility and said telephone interface structure to store said call schedule data in said memory structure for retrieval in a sequential order and for driving said telephone interface structure to provide connections from said central video terminal to said telephonic television terminal units in accordance with said sequential order for video communication.

2. A system according to claim 1 wherein said telephone interface structure includes an autodialer unit for calling said telephonic television terminal units.

3. A system according to claim 1 wherein said telephone interface structure includes an audio response unit for prompting the provision of said call schedule data.

4. A system according to claim 1 wherein said telephone interface structure includes a test apparatus for authenticating the entry of said call schedule data.

5. A system according to claim 1 wherein said central station video terminal includes a plurality of video format circuits for communicating with said telephonic television terminal units.

6. A system according to claim 5 wherein said computer control structure addresses said memory structure to select and actuate one of said video format circuits on connection to a telephone television terminal unit.

7. A system according to claim 5 wherein said central video terminal unit includes a switch for actuating said video format circuits.

8. A system according to claim 1 wherein said central video terminal unit includes a recorder.

9. A system according to claim 8 wherein said recorder comprises a printer.

10. A system according to claim 1 including a plurality of central video terminals and said computer control structure provides connections to said telephonic television terminal units selectively to said central video terminals.

11. A system according to claim 1 wherein said telephonic interface structure further includes "D" channel type signal processing apparatus to address said memory structure.

12. A system according to claim 1 wherein said memory structure stores identification data for said telephonic television terminal units.

13. A system according to claim 1 wherein said memory structure stores billing data for said telephonic television terminal units.

14. A system for communicating with a plurality of remote locations from a central station utilizing a dial-up telephone facility and telephonic television terminal units at said remote locations, said system comprising:

memory structure for storing call schedule data on said telephonic television terminal units wherein each of said telephonic television terminal units operates in a specific one of multiple video formats;

telephone interface structure for interfacing said dial-up telephone facility to accomplish communication;

a plurality of central video terminals, each including a speakerphone unit and a display device for providing a television display in any specific one of said multiple video formats; and computer control structure for receiving calls through said dial-up telephone facility and said telephone interface structure to store said call schedule data in said memory structure and for retrieving said call schedule data for driving said telephone interface structure to provide connections from selective of said central video terminals to selective of said telephonic television terminal units.

15. A system according to claim 14 wherein said telephone interface structure includes an autodialer unit for calling said telephonic television terminal units.

16. A system according to claim 14 wherein said telephone interface structure includes an audio response unit for prompting the provision of said call schedule data.

17. A system according to claim 14 wherein said telephone interface structure includes a test apparatus for authenticating the entry of said call schedule data.

18. A system for communicating with a plurality of remote locations from a central station utilizing a dial-up telephone facility and telephonic television terminal units and wherein said telephonic television terminal units are located at said remote locations, said system comprising:

memory structure for storing call schedule data on said telephonic television terminal units wherein each of said telephonic television terminal units operates in a specific one of a plurality of video formats;

telephone interface structure for interfacing said dial-up telephone facility to accomplish communication;

at least one central video terminal including a speakerphone unit and a display device for providing television displays and selectively operable in said plurality of video formats; and computer control structure for receiving calls through said dial-up telephone facility and said telephone interface structure to store said call data schedule in said memory structure for retrieval to drive said telephone interface structure to provide connections from said central video terminal to said telephonic television terminal in a select video format from said plurality of video formats.

19. A system according to claim 18 wherein said telephone interface structure includes an autodialer unit for calling said telephonic television terminal units.

20. A system according to claim 18 wherein said telephone interface structure includes an audio response unit for prompting the provision of said call schedule data.

21. A system according to claim 18 wherein said telephone interface structure includes a test apparatus for authenticating the entry of said call schedule data.

22. A system according to claim 18 including a plurality of central video terminals and said computer control structure provides connections to said telephonic television terminal units selectively to said central video terminals.

23. A system according to claim 18 wherein said telephone interface structure includes means for providing "D" channel type signals for addressing said memory structure.

24. A process for communicating with a plurality of remote locations from a central station utilizing a dial-up telephone facility and telephonic television terminal units at said remote locations, said process including the steps of:

using telephonic interface techniques to receive and store schedule data from remote locations regarding call appointments for specific telephonic television terminal units, each of said telephonic television terminal units operating in a specific one of multiple video formats;

in time sequence, calling telephonic television terminal units for video communication in accordance with said stored schedule data and a predetermined video format; and interfacing the called telephonic television units for video communication in the predetermined video format in the time sequence.

* * * * *

Disclaimer

5,495,284 — Ronald A. Katz, Los Angeles, CA (US). SCHEDULING AND PROCESSING SYSTEM FOR TELEPHONE VIDEO COMMUNICATION. Patent dated February 27, 1996. Disclaimer filed January 28, 2016, by the assignee, Telebuyer, LLC.

Hereby disclaim complete claims 1-24 of said patent.

*(Official Gazette, April 5, 2016)*